US012600128B2

(12) United States Patent
Shimosato

(10) Patent No.: US 12,600,128 B2
(45) Date of Patent: Apr. 14, 2026

(54) LIQUID EJECTING HEAD AND LIQUID EJECTING APPARATUS

(71) Applicant: RISO Technologies Corporation, Tokyo (JP)

(72) Inventor: Masashi Shimosato, Mishima Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 149 days.

(21) Appl. No.: 18/341,441

(22) Filed: Jun. 26, 2023

(65) Prior Publication Data

US 2024/0140092 A1 May 2, 2024

(30) Foreign Application Priority Data

Oct. 26, 2022 (JP) ................................ 2022-171780

(51) Int. Cl.
*B41J 2/14* (2006.01)

(52) U.S. Cl.
CPC ................................ *B41J 2/14233* (2013.01)

(58) Field of Classification Search
CPC .......... B41J 2/14233; B41J 2002/14491; B41J 2/14274; B41J 2/1632; B41J 2/01
See application file for complete search history.

(56) References Cited

U.S. PATENT DOCUMENTS 6,336,717 B1 1/2002 Shimada
6,502,928 B1 1/2003 Shimada
7,196,458 B2 3/2007 Hiyoshi
8,636,344 B2 1/2014 Koda
11,633,952 B2 4/2023 Nakano
(Continued)

FOREIGN PATENT DOCUMENTS

CN 1592975 A 3/2005
CN 102963128 A 3/2013
CN 114161834 A 3/2022
(Continued)

OTHER PUBLICATIONS

Extended European Search Report dated Jan. 19, 2024, mailed in counterpart European Application No. 23189615.0, 10 pages.
(Continued)

*Primary Examiner* — Lisa Solomon
(74) *Attorney, Agent, or Firm* — Kim & Stewart LLP

(57) ABSTRACT

A liquid ejecting head includes a piezoelectric member formed of a piezoelectric material. The piezoelectric member has grooves extending lengthwise in a first direction. The grooves separate portions of the piezoelectric member into a plurality of piezoelectric elements spaced from each other in a second direction. A connection portion of the piezoelectric member is under at least a portion of the grooves in a third direction. The connection portion connects the piezoelectric elements to each other. Individual electrodes are on first lateral surfaces of the piezoelectric elements on a first side of the piezoelectric member. A common (shared) electrode is on second lateral surfaces of the piezoelectric elements on a second side of the piezoelectric member. Each groove has a depth in an end portion of the groove on the first side that is deeper than a depth in an end portion of the groove on the second side.

19 Claims, 7 Drawing Sheets

(56) References Cited

U.S. PATENT DOCUMENTS

2022/0305786 A1* 9/2022 Shimosato ........... H10N 30/057

FOREIGN PATENT DOCUMENTS

| | | | |
|---|---|---|---|
| CN | 115122772 | A | 9/2022 |
| EP | 0976560 | A2 | 2/2000 |
| JP | 2003211655 | A | 7/2003 |
| JP | 2010062196 | A | 3/2010 |
| JP | 2013065663 | A | 4/2013 |
| JP | 5668382 | B2 | 2/2015 |
| WO | 9510416 | A1 | 4/1995 |

OTHER PUBLICATIONS

U.S. Appl. No. 18/340,540, filed Jun. 23, 2023.
Chinese Office Action dated Jan. 27, 2026, mailed in counterpart Chinese Application No. 202310869057.4, 13 pages.

* cited by examiner

LIQUID EJECTING HEAD AND LIQUID EJECTING APPARATUS

CROSS-REFERENCE TO RELATED APPLICATION

This application is based upon and claims the benefit of priority from Japanese Patent Application No. 2022-171780, filed Oct. 26, 2022, the entire contents of which are incorporated herein by reference.

FIELD

Embodiments described herein relate generally to a liquid ejecting head and a liquid ejecting apparatus.

BACKGROUND

A piezoelectric actuator using a piezoelectric material such as PZT can be used to drive liquid ejections of a liquid ejecting apparatus such as an inkjet printer head. For example, a configuration may be adopted in which a plurality of grooves are formed in a piezoelectric body to form divided columnar elements to serve as actuator elements is known. In such configurations, external electrodes are formed on one side of the elements to serve as individual electrodes to which driving voltages can be individually applied and on the other side of the elements to serve as a common electrode to which the same voltage (e.g., a ground voltage) is applied. The individual electrodes are separate (electrically distinct) and the common electrode portions are all connected.

DETAILED DESCRIPTION

In general, according to one embodiment, a liquid ejecting head includes a piezoelectric member and individual and common electrodes. The piezoelectric member is formed of a piezoelectric material, has a plurality of grooves formed in one direction, and includes a plurality of piezoelectric elements separated by the grooves and a connection portion connecting the piezoelectric elements to each other. The individual and common electrodes are formed on lateral surfaces of the piezoelectric member on one side and the other side in the one direction. Each groove has a depth in an end portion on the first side that is deeper than a depth in an end portion on the second side.

Figure 1:
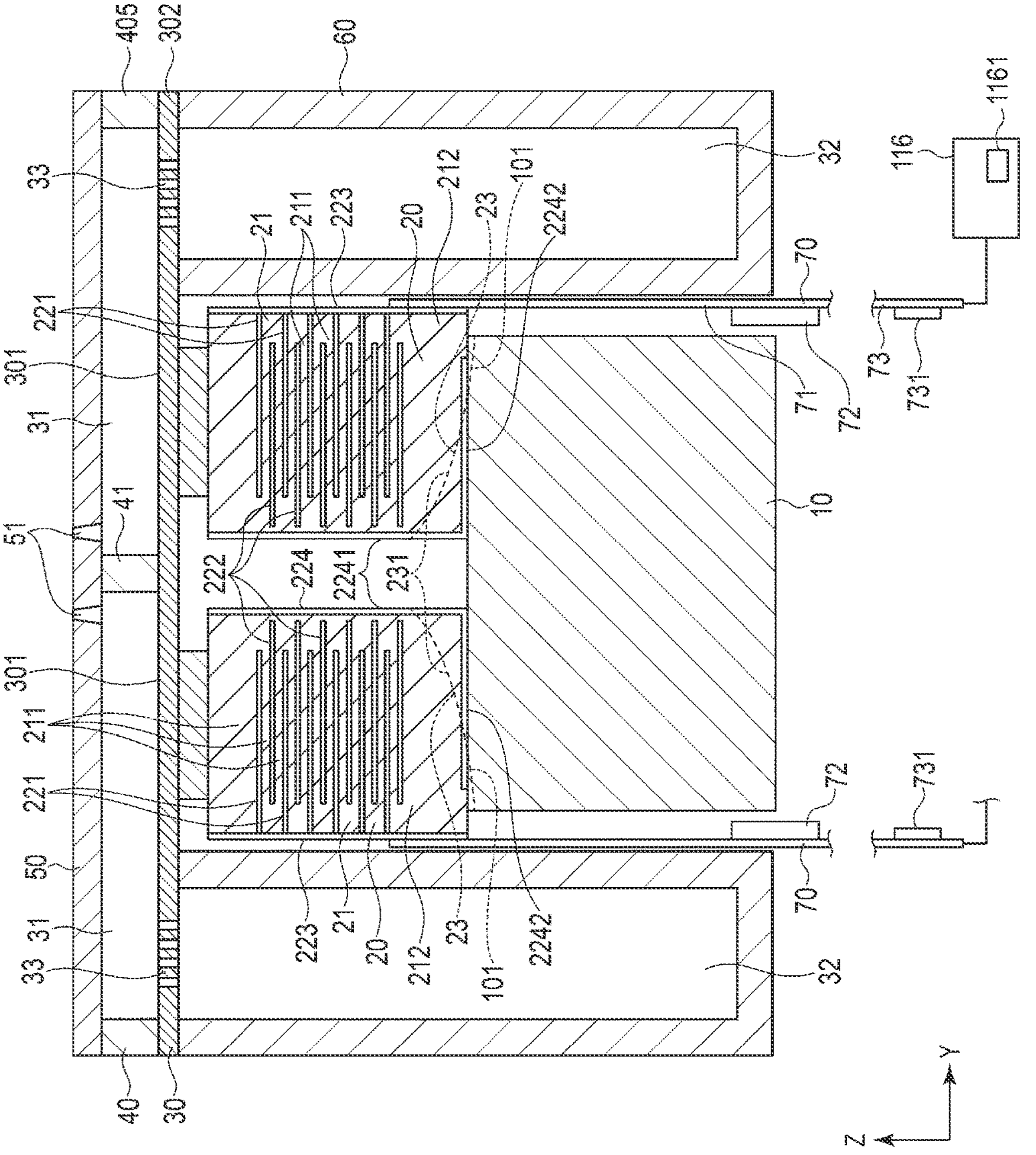
FIG. 1 is a cross-sectional view of an inkjet head according to an embodiment.
Figure 2:
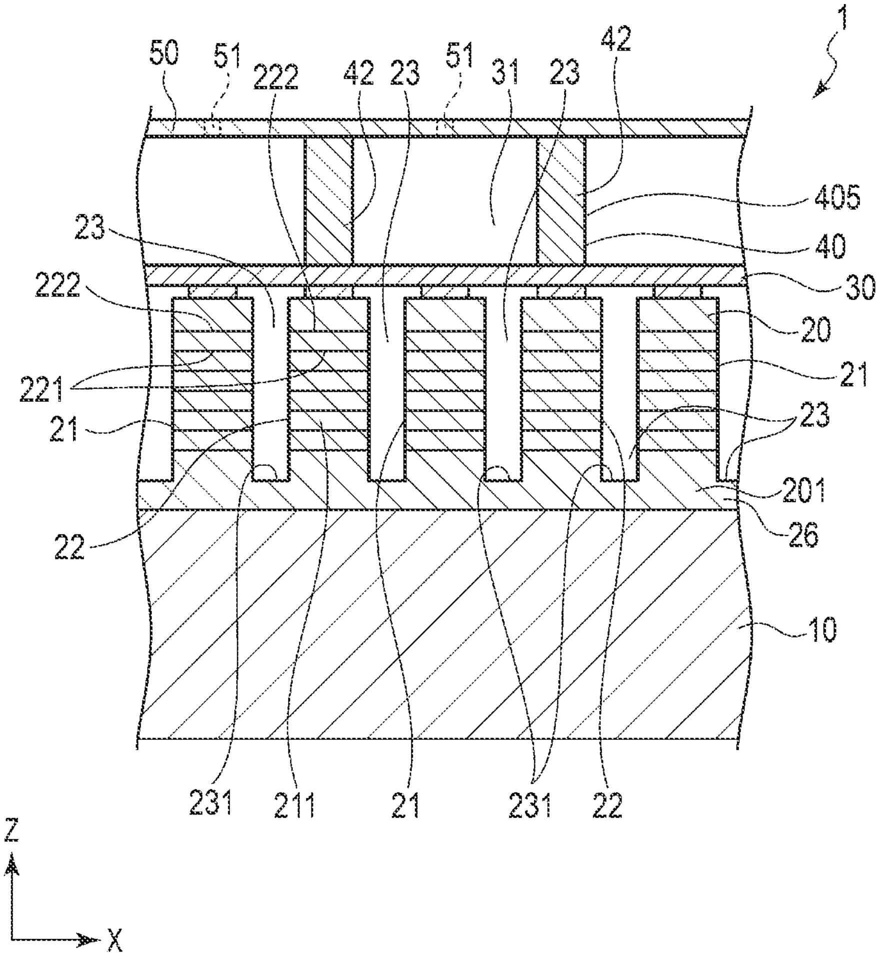
FIG. 2 is a cross-sectional view of an inkjet head according to an embodiment.
Figure 3:
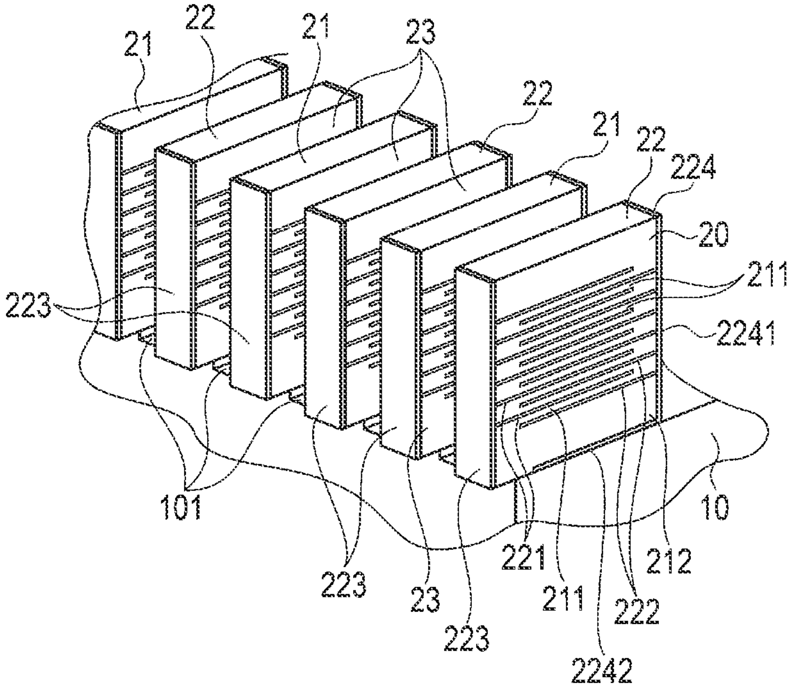
FIG. 3 is a perspective view illustrating a part of an inkjet head according to an embodiment.
Figure 4:
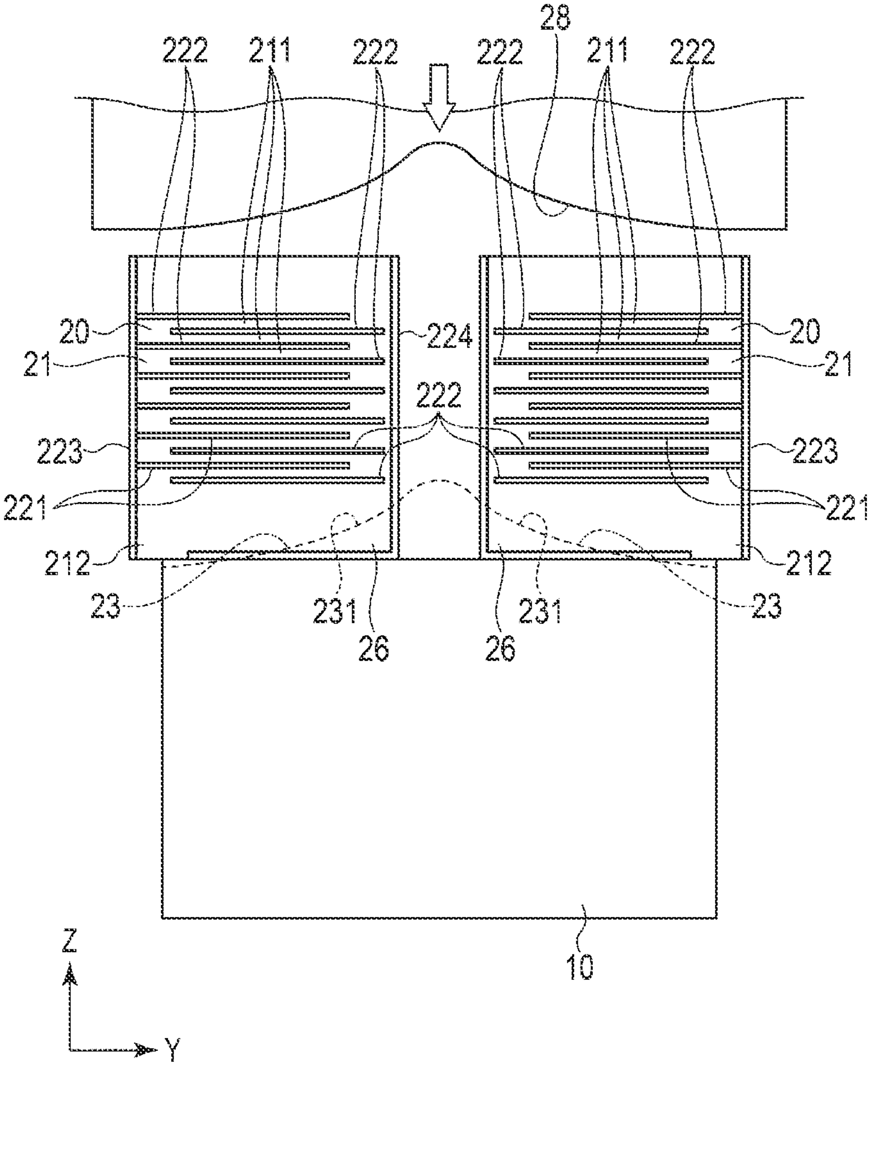
FIG. 4 is a diagram illustrating aspects of a method for manufacturing an inkjet head according to an embodiment.
Figure 5:
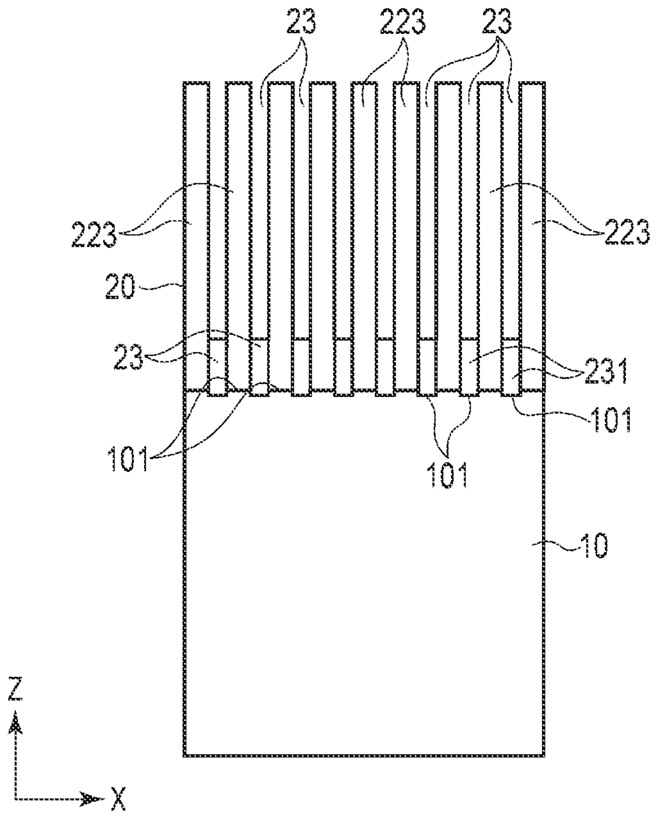
FIG. 5 is a side view illustrating one side of an actuator unit of an inkjet head according to an embodiment.
Figure 6:
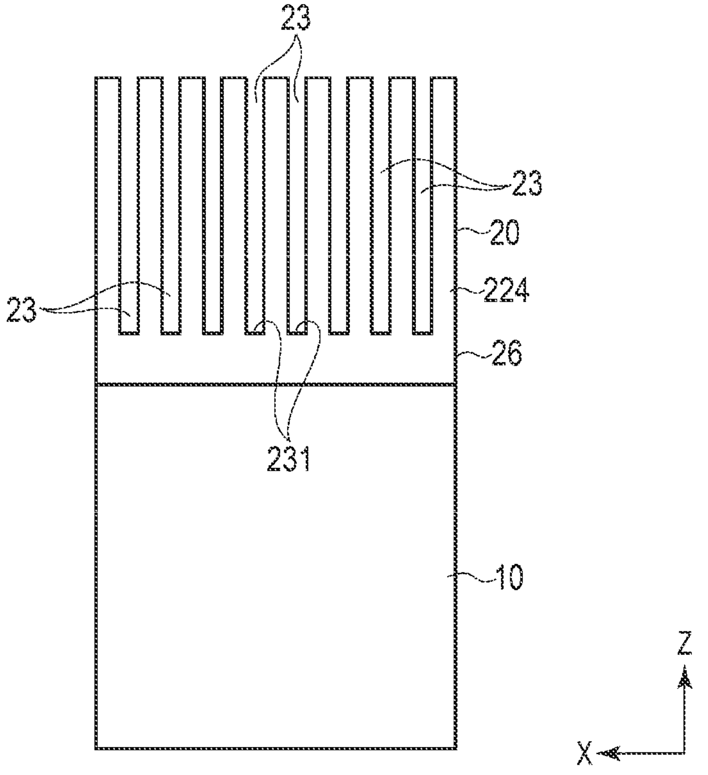
FIG. 6 is a side view illustrating another side of an actuator unit of an inkjet head according to an embodiment.
Figure 7:
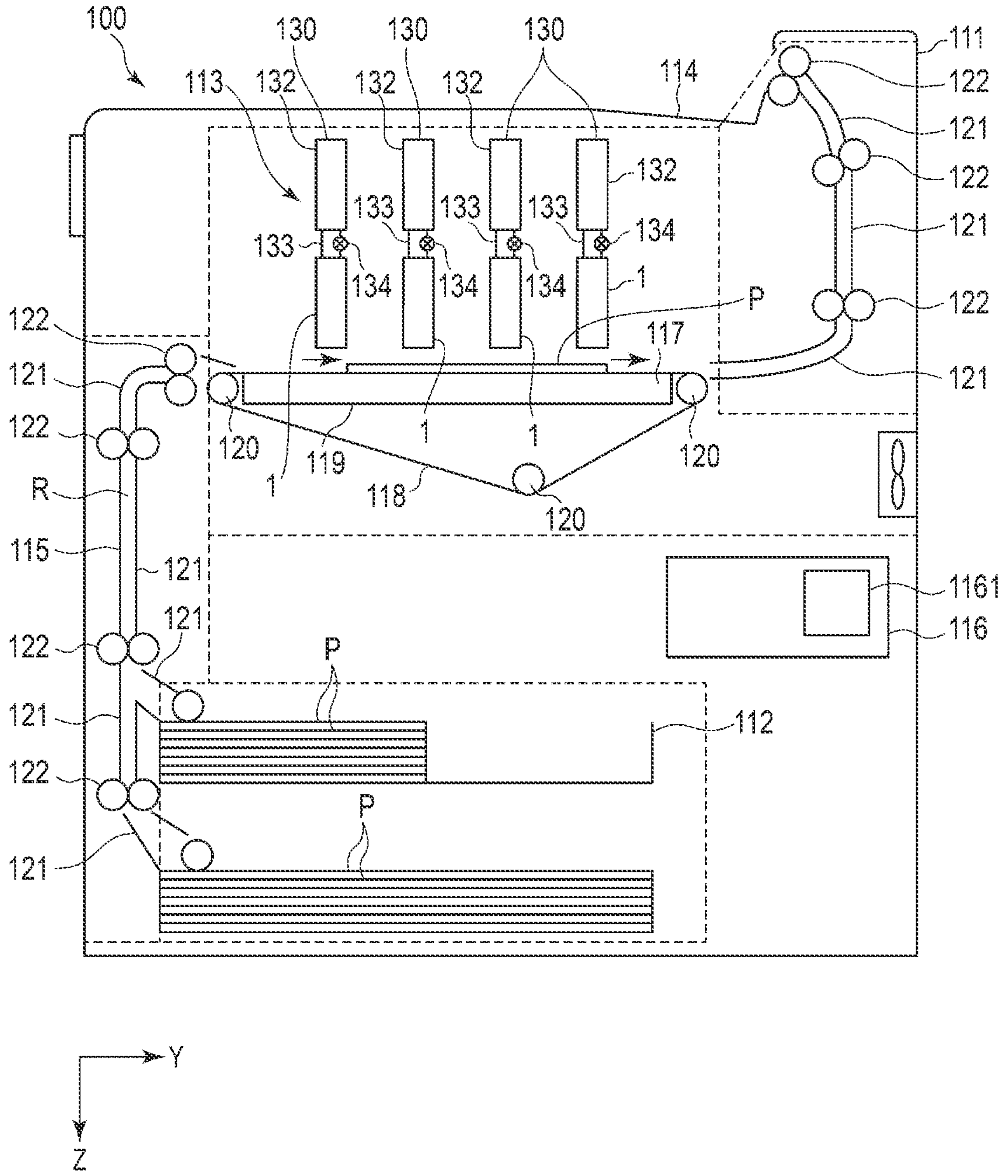
FIG. 7 is a diagram illustrating a schematic configuration of an inkjet recording apparatus.

Hereinafter, an inkjet head 1, which is a liquid ejecting head, and an inkjet recording apparatus 100, which is a liquid ejecting apparatus, according to certain embodiments will be described with reference to FIGS. 1 to 7. FIGS. 1 and 2 are cross-sectional views illustrating schematic configurations of the inkjet head 1. FIG. 3 is a perspective view illustrating a configuration of a part of the inkjet head 1. FIG. 4 is a diagram illustrating aspects of a method for manufacturing the inkjet head 1. FIG. 5 is a side view illustrating an individual electrode side of the inkjet head 1, and FIG. 6 is a side view illustrating the common electrode side of the inkjet head 1. FIG. 7 is a diagram illustrating a schematic configuration of the inkjet recording apparatus 100. In the drawings, certain aspects, elements, or components may be scaled up or down or omitted as appropriate for purposes of description.

As illustrated in FIGS. 1 and 2, the inkjet head 1 includes a base 10, a pair of actuator units 20, a flow passage member 40, a nozzle plate 50 including a plurality of nozzles 51, a frame unit 60, and a driving circuit 70.

In this example, the inkjet head 1 includes two actuator units 20, two nozzle rows in which the plurality of nozzles 51 are arranged in a row direction (the X direction), two pressure chamber rows in which a plurality of pressure chambers 31 are arranged in the row direction, and two element rows in which a plurality of piezoelectric elements 21 and 22 are arranged in the row direction. In the present embodiment, an example in which a stacking direction of piezoelectric layers 211 coincides with the vibration direction of the piezoelectric elements 21 and 22 and vibration plate 30 along the Z direction is given.

The base 10 is a support member that supports the pair of actuator units 20. The base 10 is configured in, for example, a block shape or a plate shape. In regions of the base 10 on one side in the extension direction in a surface layer portion in which the actuator units 20 are mounted, a plurality of grooves 101 in the extension direction are formed. The plurality of grooves 101 are arranged in parallel and are formed continuously with the grooves 23 of the actuator units 20.

As illustrated in FIGS. 1 to 3, the actuator units 20 are joined to one side of the base 10. The actuator units 20 are provided on, for example, the base 10. For example, two actuator units 20 are arranged side by side in the Y direction.

The actuator units 20 are formed from piezoelectric materials and include a plurality of driving piezoelectric elements 21 and a plurality of non-driving piezoelectric elements 22 alternately arranged in the row direction. A connection portion 26 of the actuator unit 20 integrally connects the plurality of piezoelectric elements 21 and 22 to one another on the base 10 side. The piezoelectric elements are formed from a stacked piezoelectric member 201 in which the plurality of piezoelectric layers 211 and a plurality of internal electrodes 221 and 222 are stacked.

In an actuator unit 20, the plurality of driving piezoelectric elements 21 and the plurality of non-driving piezoelectric elements 22 are arranged at a constant interval along one direction.

For example, the driving piezoelectric elements 21 and the non-driving piezoelectric elements 22 are both configured in a rectangular parallelepiped columnar shape having the same external shape as each other. The stacked piezoelectric member 201 is divided into a plurality of portions by a plurality of grooves 23 with the same width and at the same pitch (interval).

Each groove 23 is configured so that a depth of an end portion on the individual electrode side is deeper than a depth of an end portion on the common electrode side. For example, the depth of the groove 23 is set so that one side in the extension direction is deeper than the other side. That is, by forming the groove 23 to be deeper than the bottom of the external electrode 223 forming the individual electrode, the external electrode 223 is divided on one end side into a plurality of pieces to form the plurality of individual electrodes. On the lateral surface on the other side of the stacked piezoelectric member 201, the groove 23 is shallower than the bottom of the external electrode 224, and the external electrode 224 thus remains connected as opposed to divided into separate pieces/portions. In other words, the grooves 23 have a depth which reaches at least to the base 10 on the individual electrode side end but does not reach the base 10 on the common electrode side end.

Each groove 23 has a depth reaching the base 10 in a predetermined region on at least one side. In other words, the grooves 23 formed in the one pair of actuator units 20 are continuous with the plurality of grooves 101 formed on the surface layer portion of the base 10. For example, by performing a grooving process simultaneously with a common tool for the grooves 23, the stacked piezoelectric member 201, and the base 10, the grooves 23 of the actuator units 20 and the grooves 101 of the base 10 can be simultaneously formed in the same process (the "grooving process").

For example, the driving piezoelectric elements 21 and the non-driving piezoelectric elements 22 are each formed in a rectangular shape in which a transverse direction is oriented in the row direction of the element row and a longitudinal direction is oriented in an extension direction orthogonal to the row direction and the Z direction in a plan view when viewed in the Z direction.

The driving piezoelectric elements 21 are arranged at positions facing the plurality of pressure chambers 31 formed in the flow passage member 40. For example, central positions of the driving piezoelectric elements 21 in the row direction and the extension direction and central positions of the pressure chambers 31 in the row direction and the extension direction are arranged to overlap (or approximately so) along the Z direction.

The non-driving piezoelectric elements 22 are arranged at positions facing a plurality of partition walls 42 formed in the flow passage member 40. For example, central positions of the non-driving piezoelectric elements 22 in the row direction and the extension direction and central positions of the partition walls 42 in the row direction and the extension direction are arranged to overlap (or approximately so) along the Z direction.

For example, in an actuator unit 20, a plurality of piezoelectric elements formed in a rectangular columnar shape are formed at a predetermined interval by forming the grooves 23 by dicing from the side opposite to the base 10 side of the stacked piezoelectric member 201, which may have been joined in advance to the base 10. Electrodes or the like are provided in this plurality of formed columnar elements, and the plurality of driving piezoelectric elements 21 and the plurality of non-driving piezoelectric elements 22 alternately disposed are formed in this manner.

For example, the stacked piezoelectric member 201 configuring the actuator unit 20 is formed by stacking and baking sheets/layers of piezoelectric material(s).

The driving piezoelectric element 21 and the non-driving piezoelectric element 22 are formed, for example, from stacked piezoelectric member 201. The driving piezoelectric element 21 and the non-driving piezoelectric element 22 include a plurality of stacked piezoelectric layers 211 and internal electrodes 221 and 222 on piezoelectric layers 211. For example, the driving piezoelectric element 21 and the non-driving piezoelectric element 22 have the same stacked structure. The driving piezoelectric element 21 and the non-driving piezoelectric element 22 also include external electrodes 223 and 224 formed on outer surfaces thereof.

A piezoelectric layer 211 is formed, for example, as a thin sheet of a piezoelectric ceramic material such as a lead zirconate titanate (PZT)-based or lead-free sodium potassium niobate (KNN)-based material. The plurality of piezoelectric layers 211 are stacked and adhered to each other so that a thickness direction is oriented in the stacking direction. For example, the thickness direction and the stacking direction of the piezoelectric layers 211 in the present embodiment are disposed in the vibration direction (the Z direction).

The internal electrodes 221 and 222 are conductive films formed of a bakeable conductive material such as silver palladium. The internal electrodes 221 and 222 are formed on certain regions of the surface of a piezoelectric layer 211. The internal electrodes 221 and 222 are to have mutually different polarities during operation. For example, each internal electrode 221 is formed from one end of the piezoelectric layer 211 in the Y direction but does not reach the other end of the piezoelectric layer 211 in the Y direction. The other internal electrode 222 is formed from an opposite end of the piezoelectric layer 211 from the internal electrode 221 but does not reach the other end of the piezoelectric layer 211 in the Y direction. The internal electrodes 221 and 222 are respectively connected to the external electrodes 223 and 224 formed on the lateral surfaces of the piezoelectric elements 21 and 22.

The stacked piezoelectric member 201 configuring the driving piezoelectric element 21 and the non-driving piezoelectric element 22 further includes a dummy layer 212 in one or both of the base 10 side and a nozzle plate 50 side. The dummy layer 212 is formed of, for example, the same material as that of the piezoelectric layer 211 but is not deformed in operation since an electrode is formed on only one side and an electric field is not applied thereacross. For example, the dummy layer 212 does not function as a piezoelectric body, but serves as a base for fixing the actuator unit 20 to the base 10, or serves as a polishing margin to be polished for dimensional accuracy during assembly or after assembly.

The external electrodes 223 and 224 are formed on the surfaces of the plurality of driving piezoelectric elements 21 and the plurality of non-driving piezoelectric elements 22, and configured by collecting ends of the internal electrodes 221 and 222. For example, the external electrodes 223 are formed on one end surface of the piezoelectric layer 211. The external electrodes 224 are formed on the opposite end surface of the piezoelectric layer 211. The external electrode 224 may extend to the end surface of the piezoelectric layer 211 on the base 10 side. For example, the external electrode 224 has continuous an electrode portion 2241 formed on the other lateral surface of the piezoelectric layer 211 and an electrode portion 2242 formed on a part of a bottom surface facing the base 10.

The external electrodes 223 and 224 are formed as a film of nickel (Ni), chromium (Cr), gold (Au), or the like using a known method such as a plating or sputtering method. The external electrodes 223 and 224 have different polarity in operation. The external electrodes 223 and 224 are disposed on different lateral surfaces of the plurality of driving piezoelectric elements 21 and the plurality of non-driving piezoelectric elements 22. For the external electrodes 224, the electrode portion 2241 of the bottom surface is not formed in the end of the bottom surface on the external electrode 223 side in the extension direction, and the external electrodes 224 and 223 are disposed to be separated from each other at a predetermined distance.

As an example, the external electrode 223 serves as an individual electrode and the external electrode 224 serves as a common electrode. Electrode layers formed on one lateral surface of the stacked piezoelectric member 201 are divided by the grooves 23, and thus the external electrodes 223 serving as the individual electrodes in the plurality of driving piezoelectric elements 21 and the plurality of non-driving piezoelectric elements 22 are disposed independently. That is, for the external electrodes 223 on one side, the grooves 23 are formed deeper than bottom of the deposited electrode layer, and the electrode layer is thus separated into independent portions to form the plurality of individual electrodes.

The external electrode 223 is connected to the driving circuit 70 via a flexible printed circuit (FPC) 71 (serving as a flexible wiring substrate, a wiring substrate, or the like) at one lateral surface. For example, the individual external electrode 223 is connected to a control unit 116 via a driving IC 72 of the driving circuit 70 by the FPC 71 and is configured so that driving can be controlled under the control of a control circuit 1161. In some examples, the external electrodes 224 may be routed to the lateral surface on the external electrode 223 side and may also be connected to the driving circuit 70 via the FPC 71.

For the external electrode 224, the groove 23 is shallower than the bottom of the deposited electrode layer and a common electrode is formed in which the electrode layer remains continuous (connected) in a region closer to the base 10 below the bottom of the groove 23. In the external electrodes 224, the electrode layer remains connected so that the external electrode 224 can be grounded, for example.

That is, the plurality of individual electrodes on one side of the stacked piezoelectric member 201 are separated from each other by the grooves 23 and the common electrodes on the other side of the stacked piezoelectric member 201 are connected to each other.

The dummy layer 212 is formed of the same material as that of the piezoelectric layer 211. The dummy layer 212 is not deformed in operation since an electrode is formed on only one side and an electric field is not applied thereacross. That is, the dummy layer 212 does not function as an active piezoelectric element.

The vibration direction of each of the piezoelectric elements 21 and 22 is oriented in the stacking direction and is displaced in a d33 direction by applying an electric field.

For example, each of the piezoelectric elements 21 and 22 includes 3 to 50 layers, with a thickness of each layer being 10 μm to 40 μm, such that the total thickness is less than 1,000 μm.

The driving piezoelectric elements 21 vibrate when a voltage is applied to the internal electrodes 221 and 222 via the external electrodes 223 and 224. In the present embodiment, the driving piezoelectric elements 21 vertically vibrate in the stacking direction of the piezoelectric layers 211. The vertical vibration mentioned herein is, for example, "vibration in a thickness direction defined by a piezoelectric constant d33". The driving piezoelectric elements 21 displace the vibration plate 30 through the vertical vibration to deform the pressure chambers 31.

The flow passage member 40 includes a vibration plate 30 disposed to face the actuator unit 20 and a flow passage substrate 405 stacked on the vibration plate 30.

The vibration plate 30 is provided between the flow passage substrate 405 and the actuator units 20. The vibration plate 30 forms a portion of the flow passage member 40 together with the flow passage substrate 405. The vibration plate 30 extends in a direction intersecting the lateral surface on which the individual electrodes and the common electrodes of the stacked piezoelectric member 201 are formed.

The vibration plate 30 is joined to one side of the piezoelectric layers 211 of the plurality of piezoelectric elements 21 and 22, that is, the surface on the nozzle plate 50 side. The vibration plate 30 is configured to be deformable, for example. The vibration plate 30 is joined to the driving piezoelectric elements 21 and the non-driving piezoelectric elements 22 of the actuator units 20 and the frame unit 60. For example, the vibration plate 30 includes a vibration region 301 facing the piezoelectric elements 21 and 22 and a support region 302 facing the frame unit 60.

The vibration plate 30 is, for example, a metal plate. The vibration plate 30 has a plurality of vibration portions which each face a pressure chamber 31 and can be displaced individually. The vibration plate 30 can be formed by integrally connecting the plurality of vibration portions.

For example, the vibration plate 30 is formed of nickel or a stainless steel (SUS) plate and a thickness dimension in the vibration direction is about 5 μm to 15 μm. In the vibration region 301, creases or steps may be formed in portions adjacent to the vibration portions or between the vibration portions adjacent to each other so that the vibration portions can be more easily displaced. The vibration region 301 is deformed when portions facing the driving piezoelectric elements 21 are displaced through expansion and compression of the driving piezoelectric elements 21. The vibration plate 30 may be formed by an electroforming method or the like since a very thin and complicated shape may be necessary. The vibration plate 30 is joined to the upper end surfaces of the actuator units 20 by an adhesive or the like.

The support region 302 is a plate-shaped member disposed between the frame unit 60 and the flow passage substrate 405. The support region 302 includes a communication portion 33 that has a through-hole communicating with a common chamber 32.

For example, the communication portion 33 includes therein a filter material that has many pores through which a liquid can pass.

The flow passage substrate 405 is disposed between the nozzle plate 50 and the vibration plate 30. The flow passage substrate 405 is joined to one side of the vibration plate 30.

The flow passage substrate 405 includes a guide wall 41 and the partition walls 42, and predetermined ink passages including the plurality of partitioned pressure chambers 31 or a plurality of partitioned individual flow passages communicating with the pressure chambers 31 and the common chamber 32 are formed.

Inside the flow passage 405, the plurality of pressure chambers 31 are partitioned from one another by the partition walls 42. That is, both sides of the pressure chambers 31 are formed by the partition walls 42. The pressure chambers 31 communicate with the nozzles 51 formed in the nozzle plate 50. For the pressure chambers 31, a side opposite to the nozzle plate 50 is closed by the vibration plate 30.

The plurality of pressure chambers 31 are spaces formed on one side of the vibration region 301 of the vibration plate 30 and communicate with the common chamber 32 via an individual flow passage or the communication portion 33. The pressure chambers 31 communicate with the respective nozzles 51 in the nozzle plate 50. In the pressure chambers 31, the side opposite to the nozzle plate 50 is closed by the vibration plate 30.

The plurality of pressure chambers 31 fill with a liquid supplied from the common chamber 32 and are deformed by vibration of the vibration plate 30 to eject the liquid from a nozzle 51.

The partition walls 42 partition the plurality of pressure chambers 31, and form both lateral sides of the pressure chambers 31. The partition walls 42 are disposed to face the non-driving piezoelectric elements 22 via the vibration plate 30 and are thus supported by the non-driving piezoelectric elements 22. The partition walls 42 are provided at the same pitch as the plurality of pressure chambers 31.

The nozzle plate 50 is formed in a rectangular plate shape with a thickness of about 10 μm to 100 μm and formed of, for example, a metal such as SUS-Ni (nickel steel alloy) or a resin such as a polyimide. The nozzle plate 50 is disposed on one side of the flow passage substrate 405 to cover the pressure chambers 31.

The plurality of nozzles 51 are arranged in the same arrangement direction as the pressure chambers 31 to form nozzle rows. For example, the nozzles 51 are provided in two rows and the nozzles 51 are provided at positions corresponding to the plurality of pressure chambers 31 arranged in two rows. In the present embodiment, the nozzles 51 are provided at positions near an end of the pressure chambers 31 in the extension (length) direction.

The frame unit 60 is joined to the vibration plate 30 together with the piezoelectric elements 21 and 22. The frame unit 60 is provided on the side opposite to the flow passage substrate 405 and is, for example, disposed to be adjacent to the actuator unit 20 in the present embodiment. The frame unit 60 configures the outline (outer perimeter shape) of the inkjet head 1. The inside of the frame unit 60 may incorporate or be a portion of a liquid flow passage. In the present embodiment, the frame unit 60 is joined to the vibration plate 30 to form the common chamber 32 between the frame unit 60 and the vibration plate 30.

The common chamber 32 is formed inside the frame unit 60 and communicates with the pressure chamber 31 via the individual flow passages and the communication portion 33 provided in the vibration plate 30.

The driving circuit 70 includes a flexible printed circuit (FPC) 71 (connected to the external electrodes 223 and 224), the driving IC 72 mounted on the FPC 71, and a printed wiring substrate 73 mounted on an end of the FPC 71.

The driving circuit 70 drives the driving piezoelectric elements 21 by applying a driving voltage to the external electrodes 223 and 224 by the driving IC 72 and ejects liquid droplets from the nozzles 51 by increasing and decreasing volumes of the pressure chambers 31.

The FPC 71 is connected to one lateral surface of the stacked piezoelectric member 201 and is electrically connected to the plurality of external electrodes 223 and 224. As the FPC 71, a chip-on film (COF) on which the driving IC 72 is mounted can be used.

The driving IC 72 is connected to the external electrodes 223 and 224 via the FPC 71. The driving IC 72 is an electronic component used for ejection control.

The driving IC 72 generates a control signal and a driving signal for operating each driving piezoelectric element 21. The driving IC 72 generates a control signal for control such as ink ejection timing or selection of the specific driving piezoelectric elements 21 for ejecting ink in accordance with an image signal input from the control unit 116 of the inkjet recording apparatus 100 or the like. The driving IC 72 generates a voltage to be applied to the driving piezoelectric elements 21, that is, a driving signal, in accordance with the control signal from the control unit 116. When the driving IC 72 applies the driving signal to the driving piezoelectric elements 21, the driving piezoelectric elements 21 displace the vibration plate 30 and change the volume of the pressure chambers 31. Accordingly, the ink in the pressure chambers 31 experiences a pressure vibration. Because of the pressure vibration, the ink is ejected from the nozzles 51 communicating with the pressure chambers 31. The inkjet head 1 may be configured to realize a grayscale expression by changing the amount (volume) of ink droplets per pixel. The inkjet head 1 may be configured so that the amount of ink droplets per pixel can be changed by changing the number of times (droplets) the ink is ejected. In this way, the driving IC 72 applies the driving signal to the driving piezoelectric elements 21.

For example, the driving IC 72 includes a data buffer, a decoder, and a driver. The data buffer stores time-series printing data for each driving piezoelectric element 21. The decoder controls the driver based on the printing data stored in the data buffer for each driving piezoelectric element 21. The driver outputs the driving signal for operating each driving piezoelectric element 21 under the control of the decoder. The driving signal is, for example, a voltage to be applied to each driving piezoelectric element 21.

The printed wiring substrate 73 can be a printing wiring assembly (PWA) on which various electronic components or connectors are mounted and includes a head control circuit 731. The printed wiring substrate 73 is connected to the control unit 116 of the inkjet recording apparatus 100.

In the inkjet head 1, ink flow passages including the plurality of pressure chambers 31 communicating with the nozzles 51 and the common chambers 32 respectively communicating with the plurality of pressure chambers 31 are formed by the nozzle plate 50, the frame unit 60, the flow passage substrate 405, and the vibration plate 30. For example, the common chamber 32 connects to a cartridge so that ink can be supplied to each pressure chamber 31 via the common chamber 32. All the driving piezoelectric elements 21 are connected so that a voltage can be applied by wirings. In the inkjet head 1, the driving piezoelectric elements 21 vibrate in the stacking direction, that is, the thickness direction of each piezoelectric layer 211 when the control unit 116 of the inkjet recording apparatus 100 applies the driving voltage to the electrodes 221 and 222 by the driving IC 72. That is, the driving piezoelectric elements 21 vertically vibrate in this example.

Specifically, the control unit 116 applies the driving voltage to the internal electrodes 221 and 222 of the driving piezoelectric elements 21 to be selectively driven. Then, by deforming the vibration plate 30 by the expansion and contraction of the driving piezoelectric elements 21 and thus changing the volumes of the pressure chambers 31, a liquid can be drawn from the common chamber 32 and ejected from the nozzles 51.

An example of a method for manufacturing the inkjet head 1 according to the present embodiment will be described. First, the internal electrodes 221 and 222 are formed by a printing process (e.g., a photolithographic process) on a piezoelectric layer. A plurality of piezoelectric layers 211 (and the internal electrodes 221 and 222 formed thereon) are stacked to form the stacked piezoelectric member 201 by a baking process and a polarization process.

Then, the stacked piezoelectric member 201 is disposed on the base. For example, when two actuator units 20 are to be provided, the stacked piezoelectric member 201 may be divided into two by a grooving process after the stacked piezoelectric member 201 is joined to the base 10, or, alternatively, two stacked piezoelectric members 201 for the two actuator units 20 may be prepared separately and then joined to the base 10 or the like.

Subsequently, the external electrodes 223 and 224 are formed on one end surface and the other end surface of the stacked piezoelectric member 201 by a printing process. Further, a polarization process of the driving piezoelectric elements 21 is performed for attachment to the base 10 by an adhesive or the like.

Subsequently, the plurality of grooves 23 are formed by performing a process with a tool such as a diamond cutter or the like. For example, in the present embodiment, as illustrated in FIG. 4, a bottom surface 231 of the groove 23 is formed in a curved shape gradually shallow from one side to the other side in the extension direction by forming the grooves 23 using a tool 28 that is curved and gradually reducing depth from one side to the other side in the extension direction. That is, by forming the grooves 23 with a depth which reaches through the electrode layer at one end, as illustrated in FIG. 5, the electrode layer is divided into a plurality of pieces for the independent individual electrodes. As illustrated in FIG. 6, for the common electrode the grooves 23 do not fully divide electrode layers so that connections between different portions remain at the bottom of the grooves 23. The grooves 101 are formed in the same process on the individual electrode side.

As described above, a stacked piezoelectric member 201 in which the electrode layers on one side are divided and on the other side remain connected to each is formed. By forming the plurality of grooves 23 simultaneously at a predetermined pitch and dividing the stacked piezoelectric member 201 into the plurality of pieces, a plurality of columnar elements serving as the plurality of piezoelectric elements 21 and 22 are formed. In this way, the driving piezoelectric elements 21 and the non-driving piezoelectric elements 22 arranged are formed.

The FPC 71 is mounted to the external electrodes 223 and 224 by, for example, solder mounting. The printed wiring substrate 73 including the head control circuit 731 is connected to the FPC 71.

The vibration plate 30, the flow passage substrate 405, and the nozzle plate 50 are stacked and positioned on the actuator units 20 with joining materials (e.g., adhesive) interposed therebetween, the frame units 60 are disposed on the outer circumference of the actuator units 20, the plurality of members are joined to complete the inkjet head 1.

Hereinafter, an example of the inkjet recording apparatus 100 including the inkjet head 1 will be described with reference to FIG. 7. The inkjet recording apparatus 100 includes a casing 111, a medium supply unit 112, an image forming unit 113, a medium discharging unit 114, a conveyance device 115, and a control unit 116.

The inkjet recording apparatus 100 is a liquid ejecting apparatus that performs an image forming process on a sheet P by ejecting a liquid such as ink while conveying the sheet P through the image forming unit 113 from the medium supply unit 112 along a predetermined conveyance path R reaching the medium discharging unit 114.

The casing 111 forms the outside of the inkjet recording apparatus 100. A discharging port through which the sheet P can be discharged is included at a predetermined portion of the casing 111.

The medium supply unit 112 includes a plurality of feeding cassettes and is configured so that the plurality of sheets P with various sizes can be stacked and retained.

The medium discharging unit 114 includes a discharging tray configured to retain a sheet P discharged from the discharging port.

The image forming unit 113 includes a support unit 117 that supports the sheet P and a plurality of head units 130 disposed to face the upper side of the support unit 117.

The support unit 117 includes a conveyance belt 118 that is provided in a loop shape. A support plate 119 supports the conveyance belt 118 from a rear side, and a plurality of belt rollers 120 are provided on the rear side of the conveyance belt 118.

The support unit 117 conveys the sheet P downstream. The sheet P is conveyed at the appropriate timing for printing by rotation of the conveyance belt 118 by rotation of the belt rollers 120.

The head unit 130 includes a plurality of inkjet heads 1 (four heads in this example), ink tanks 132 mounted respectively on each inkjet heads 1, connection flow passages 133 connecting the inkjet heads 1 to the ink tanks 132, and supply pumps 134.

In the present embodiment, inkjet heads 1 for four colors (cyan, magenta, yellow, and black) and ink tanks 132 for these colors are included. The ink tanks 132 are connected to the inkjet heads 1 by a connection flow passage 133.

A negative pressure control device such as a pump is connected to the ink tank 132. By pressure adjustments on the inside of the ink tank 132 by the negative pressure control device in accordance with water head values (hydraulic head pressures) for the inkjet head 1 and the ink tank 132, the ink supplied to each nozzle 51 of the inkjet head 1 can be formed in a meniscus of a predetermined shape.

The supply pump 134 is, for example, a liquid feeding pump configured as a piezoelectric pump. The supply pump 134 is provided in a supply flow passage. The supply pump 134 is connected to the control circuit 1161 of the control unit 116 by a wiring and is configured so that the supply pump 134 can be controlled by the control unit 116. The supply pump 134 supplies liquid to the inkjet head 1.

The conveyance device 115 conveys the sheet P from the medium supply unit 112 through the image forming unit 113 along the conveyance path R eventually reaching the medium discharging unit 114. The conveyance device 115 includes a plurality of guide plate pairs 121 disposed along the conveyance path R and a plurality of conveyance rollers 122.

Each of the guide plate pairs 121 includes a pair of plate members disposed to face each other with the conveyed sheet P passing therebetween and thus guides the sheet P along the conveyance path R.

The conveyance rollers 122 are driven under the control of the control unit 116 so that the sheet P is conveyed downstream along the conveyance path R. On the conveyance path R, a sensor detecting a sheet conveyance status can be disposed at various positions.

The control unit 116 includes a control unit 1161 such as a CPU (central processing unit) which is a controller, a read-only memory (ROM) that stores various programs and the like, a random access memory (RAM) that temporarily stores various types of variable data, image data, and the like, and an interface unit that receives data from the outside and outputs data to the outside.

In the inkjet recording apparatus 100, when a printing instruction given by a user operating an operation input unit is detected, the control unit 116 drives the inkjet heads 1 and the conveyance device 115 to convey the sheet P while outputting a printing signal to the head units 130 at a predetermined timing. The inkjet heads 1 send a driving signal to the driving IC 72 as an image signal in accordance with image data for an ejecting (printing) operation, apply the driving voltages to the internal electrodes 221 and 222, selectively drive the piezoelectric elements 21 of the ejection target to vertically vibrate the driving piezoelectric elements 21 in the stacking direction, eject the ink from the nozzles 51 by changing the volumes of the pressure chambers 31, and form an image on the sheet P on the conveyance belt 118. As a liquid ejecting operation, the control unit 116 supplies the ink from the ink tanks 132 to the common chambers 32 of the inkjet heads 1 by driving the supply pumps 134.

Here, a driving operation of driving the inkjet head 1 will be described. The inkjet head 1 according to the present embodiment includes a driving piezoelectric element 21 disposed to face the pressure chamber 31, and the driving piezoelectric element 21 is connected to a wiring so that a voltage can be applied thereto. The control unit 116 transmits a driving signal to the driving IC 72 in accordance with image data, applies a driving voltage to the internal electrodes 221 and 222 of the driving piezoelectric element 21 to be driven, and selectively deforms the driving piezoelectric element 21. A liquid droplet is ejected by changing the volume of the pressure chamber 31 by deformation of the vibration plate 30.

For example, the control unit 116 alternately performs a expansion operation and a compression operation. In the inkjet head 1, in the expansion operation of increasing an internal volume of the target pressure chamber 31, the driving piezoelectric element 21 of the driving target is contracted. A driving piezoelectric element 21 which is not a driving target is not deformed at this time. In a compression operation, the driving piezoelectric element 21 is expanded.

According to the inkjet head 1 and the inkjet recording apparatus 100, the plurality of individual electrodes may be more easily formed along with the common electrodes only by adjusting the depth of the grooves in the fabrication step. That is, processing steps can be reduced compared with a case where parts of lateral surfaces are cut to separate the individual electrodes. Since the required area of the common electrode can be provided easily by this method, increased resistance of the common electrode can be avoided and higher printing quality can be provided.

The present disclosure is not limited to the foregoing examples, and such examples or embodiments can be modified and still be within the scope of the present disclosure.

Figure 8:
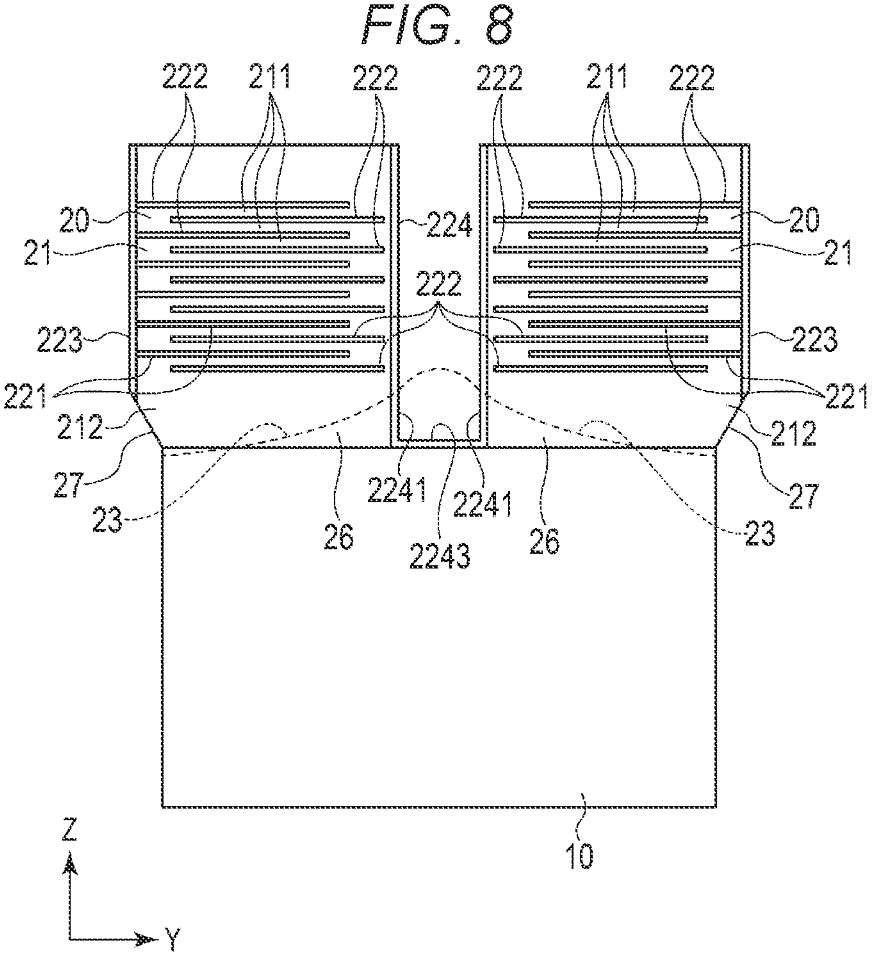
FIG. 8 is a diagram illustrating an inkjet head and a manufacturing method thereof according to a second embodiment.

In an embodiment, a part of the external electrodes 224 are formed on the surface facing the base 10, but as illustrated in FIG. 8, the electrode layers need not be formed on a facing surface of the actuator units 20 and the base 10.

In an embodiment, the external electrodes 223 and 224 are formed before the actuator units 20 are joined to the base 10, but the present disclosure is not limited thereto. For example, the external electrodes 223 and 224 may be formed after the actuator units 20 are joined to the base 10. In this case, the electrode layers are not formed on the facing surface of the actuator unit 20 and the base 10. For example, as another embodiment, as illustrated in FIG. 8, an electrode portion 2243 configuring a part of the external electrode 224 (common electrode) may be continuously formed on the surface of the base 10 between the pair of actuator units 20.

As another embodiment, as illustrated in FIG. 8, a removal portion 27 that has an inclined surface obliquely inclined in the stacking direction may be formed at an end on the base 10 side on a lateral surface on the individual electrode side of the stacked piezoelectric member 201. The removal portion 27 in this context can be a chamfered portion formed by cutting the corner of stacked piezoelectric member 201 into a tapered (inclined) shape so that a region of the piezoelectric element 21 at the end of the base 10 side is angled in a direction away from the FPC 71.

For example, the removal portion 27 is provided in the dummy layer 212. That is, in the piezoelectric element 21, a portion which does not function as an active piezoelectric body and is not deformed in operation may be partially cut and formed in an inclined surface shape. The removal portion 27 may also or instead be located in the piezoelectric layer 211. In such a case, the removal portion 27 may be disposed at positions avoiding the internal electrodes 221 and 222 and the external electrodes 223 and 224.

The specific materials or configuration of the piezoelectric elements 21 and 22 in is not limited to the foregoing materials or configurations, but may be changed.

In an embodiment, the plurality of piezoelectric layers 211 are stacked and the driving piezoelectric elements 21 are driven through the vertical vibration (d33) in the stacking direction, but in other examples, the driving piezoelectric elements 21 may be configured as a single-layered piezoelectric member or have a form in which the driving piezoelectric elements 21 are driven through lateral vibration displaced in a d31 direction.

The arrangement of the nozzles 51 or the pressure chambers 31 is also not limited. For example, the nozzles 51 may be arranged in two or more rows. An air chamber serving as a dummy chamber may be formed between otherwise adjacent pressure chambers 31. The inkjet head 1 may be a non-circulation type inkjet head or a circulation type inkjet head. The inkjet head 1 may be a side-shooter type inkjet head or an end-shooter inkjet head.

In an example, the piezoelectric elements 21 and 22 include the dummy layers 212 at both ends in the stacking direction, in other examples, the dummy layer 212 may be included on only one or the other the top or bottom of the piezoelectric elements 21 and 22. In still other examples, the piezoelectric elements 21 and 22 do not need to include a dummy layer 212. In addition, a configuration or a positional relationship of various components including the flow passage member 40, the nozzle plate 50, and the frame unit 60 is not limited to the above-described examples, but can be appropriately changed.

In an embodiment, two actuator units 20 are disposed in parallel on the base 10, but a single actuator unit 20 may be used in other examples.

The liquid to be ejected is not limited to printing ink. For example, an apparatus or the like ejecting a liquid containing conductive particles for forming a wiring pattern of a printed wiring substrate may be used.

In an embodiment, the inkjet head 1 is used for an inkjet recording apparatus (a printer) described, but the present embodiment is not limited thereto. For example, the inkjet head 1 can also be used for a 3D printer, an industrial manufacturing machine, a medical device purpose, or the like and a miniaturized, lightweight, and low-cost inkjet head 1 can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejecting head, comprising:

a piezoelectric member formed of a piezoelectric material, the piezoelectric member having a plurality of grooves extending lengthwise in a first direction, the grooves separating portions of the piezoelectric member into a plurality of piezoelectric elements spaced from each other in a second direction, a connection portion of the piezoelectric member being under at least a portion of the grooves in a third direction, the connection portion connecting the plurality of piezoelectric elements to each other;

individual electrodes on first lateral surfaces of the piezoelectric elements on a first side of the piezoelectric member;

a support member joined to a bottom surface of the connection portion of the piezoelectric member; and a common electrode on second lateral surfaces of the piezoelectric elements on a second side of the piezoelectric member, wherein each groove has a depth in an end portion of the groove on the first side that is deeper than a depth in an end portion of the groove on the second side, and the support member does not extend beyond the piezoelectric member in the first direction.

2. The liquid ejecting head according to claim 1, further comprising:

a vibration plate on an upper surface of the piezoelectric member, wherein the individual electrodes are separated from each other on the first side of the piezoelectric member by the grooves, and the common electrode on the second side of the piezoelectric member is connected by conductive portions in the grooves.

3. The liquid ejecting head according to claim 2, the depth of the grooves on the first side reaches the support member.

4. The liquid ejecting head according to claim 1, wherein the depth of the grooves on the second side does not reach the support member.

5. The liquid ejecting head according to claim 1, wherein the width of support member in the first direction is less than the width of the bottom surface of the connection portion in the first direction.

6. The liquid ejecting head according to claim 1, wherein the piezoelectric member has a chamfered portion between the first side of the piezoelectric member and the bottom surface of the connection portion.

7. The liquid ejecting head according to claim 6, further comprising:

a first flexible printed circuit bonded to the individual electrodes on the first lateral surfaces of the piezoelectric elements.

8. The liquid ejecting head according to claim 7, further comprising:

a second flexible printed circuit bonded to common electrode on the second lateral surfaces of the piezoelectric elements.

9. The liquid ejecting head according to claim 1, wherein the piezoelectric member is a stacked piezoelectric member comprises a plurality of stacked piezoelectric layers with a plurality of internal electrodes within the stacked piezoelectric member.

10. The liquid ejecting head according to claim 1, the depth of the grooves on the first side reaches the support member, and the depth of the grooves on the second side which does not reach the support member.

11. The liquid ejecting head according to claim 10, wherein the width of support member in the first direction is less than the width of the bottom surface of the connection portion in the first direction.

12. The liquid ejecting head according to claim 10, wherein the piezoelectric member has a chamfered portion between the first side of the piezoelectric member and the bottom surface of the connection portion.

13. The liquid ejecting head according to claim 1, further comprising:

a first flexible printed circuit bonded to the individual electrodes on the first lateral surfaces of the piezoelectric elements; and a second flexible printed circuit bonded to common electrode on the second lateral surfaces of the piezoelectric elements.

14. A liquid ejection apparatus, comprising:

a liquid ejection head configured to eject a liquid, the liquid ejection head including:

a piezoelectric member formed of a piezoelectric material, the piezoelectric member having a plurality of grooves extending lengthwise in a first direction, the grooves separating portions of the piezoelectric member into a plurality of piezoelectric elements spaced from each other in a second direction, a connection portion of the piezoelectric member being under at least a portion of the grooves in a third direction, the connection portion connecting the plurality of piezoelectric elements to each other;

individual electrodes on first lateral surfaces of the piezoelectric elements on a first side of the piezoelectric member;

a support member joined to a bottom surface of the connection portion of the piezoelectric member; and a common electrode on second lateral surfaces of the piezoelectric elements on a second side of the piezoelectric member, wherein each groove has a depth in an end portion of the groove on the first side that is deeper than a depth in an end portion of the groove on the second side, and the support member does not extend beyond the piezoelectric member in the first direction.

15. The liquid ejection apparatus according to claim 14, further comprising:

a sheet conveyor configured to convey a sheet past the liquid ejection head, wherein the liquid ejection head is positioned to eject the liquid towards the sheet on the sheet conveyor.

16. The liquid ejection apparatus according to claim 14, further comprising:

a vibration plate on an upper surface of the piezoelectric member, wherein the individual electrodes are separated from each other on the first side of the piezoelectric member by the grooves, and the common electrode on the second side of the piezoelectric member is connected by conductive portions in the grooves.

17. The liquid ejection apparatus according to claim 16, the depth of the grooves on the first side reaches the support member.

18. The liquid ejection apparatus according to claim 14, wherein the width of support member in the first direction is less than the width of the bottom surface of the connection portion in the first direction.

19. The liquid ejection apparatus according to claim 14, wherein the individual electrodes are separated from each other on the first side of the piezoelectric member by the grooves, the common electrode on the second side of the piezoelectric member is connected by conductive portions in the grooves, the depth of the grooves on the first side reaches the support member, and the depth of the grooves on the second side which does not reach the support member.

* * * * *